United States Patent

Ittner

Patent Number: 5,970,169
Date of Patent: Oct. 19, 1999

[54] METHOD AND APPARATUS FOR IMAGE ENHANCEMENT

[75] Inventor: David J. Ittner, Manalapan, N.J.

[73] Assignee: AT&T Corp., New York, N.Y.

[21] Appl. No.: 08/941,331

[22] Filed: Sep. 30, 1997

[51] Int. Cl.[6] ................................ G06K 9/62; G06T 3/40

[52] U.S. Cl. ............................................ 382/160; 382/300

[58] Field of Search ...................................... 358/465, 466, 358/451, 448, 447; 382/159, 160, 155, 299, 300

[56] References Cited

U.S. PATENT DOCUMENTS 5,387,985  2/1995  Loce et al. .............................. 358/447
5,579,445  11/1996  Loce et al. .............................. 395/102

*Primary Examiner*—Scott Rogers

[57] ABSTRACT

A method and apparatus for enhancing images for facsimile machines, printers, etc., is provided. An independent training phase is used to train a system processor to create a probability table based on the surrounding pixel pattern of a given pixel in a training document. The training data generated is used in an enhancement phase where unknown pixels are determined based on the probability table generated during the training phase.

23 Claims, 6 Drawing Sheets

METHOD AND APPARATUS FOR IMAGE ENHANCEMENT

BACKGROUND OF THE INVENTION

1. Field of Invention

This invention relates to enhancement of facsimile image quality for standard resolution images.

2. Description of Related Art

Facsimile machines generally image and transmit documents at a resolution of either approximately 200 dots per inch (dpi) horizontally and 100 dpi vertically (so-called standard resolution) or at 200×200 dpi (fine or detailed resolution). This practice is defined by the Group 3 standards. The detailed resolution offers higher image quality, but the standard resolution is used more frequently.

However, 200×100 dpi images are more difficult to read and are more susceptible to distortion than 200×200 dpi images. Nonetheless, the 200×200 dpi detailed resolution is slower and consumes more memory than the standard 200×100 dpi image. Thus, a need exists for producing high quality 200×200 dpi images with the speed and lower required memory capacity of a 200×100 dpi image.

There are two common methods for producing a 200×200 dpi facsimile image from a 200×100 dpi image. The first method uses simple scan line duplication that produces coarse results. This method is commonly used by facsimile machines to normalize a received standard resolution fax image. The duplication method simply applies the same value of the pixels in an adjacent scan line to the value of the unknown pixels.

The second method, one example described in McConnell and Bodson, in the book "Digital Facsimile Technology and Applications Handbook", which is incorporated herein by reference, uses fixed interpolation. The interpolation method uses an algorithm that only considers the pixels contained in the immediately touching scan lines in determining the value of an unknown pixel. Thus, the accuracy of determining missing pixels using the interpolation method is limited.

Consequently, the duplication and interpolation methods fail to produce significantly high quality images.

SUMMARY OF THE INVENTION

The present invention provides a method and apparatus for enhancing a lower resolution image into a higher resolution image. Using a set of training images, a statistical model may be derived that allows the enhancement of a document to produce a high quality image. This technique may be used, for example, in facsimile machines, computer displays, and printers.

The method of enhancing an image may include a training phase for recognition of pixel patterns surrounding a given pixel on commonly used documents. A probability table may be constructed and indexed for all possible configurations of pixels surrounding a given pixel.

Once the processor has been trained, the system may be free to enter the enhancement phase. In the enhancement phase, a horizontal scan line of pixels of unknown value is added between existing pixel lines in the vertical direction of a document input to the system. A probability table obtained in the training phase may then be applied to the unknown pixels between each of the known existing pixels. Values of the unknown pixels are then determined from the probability table. The retrieved probability is an estimate that the pixel in question is on or off.

The final image may be treated as a gray scale image, for example, and displayed to a computer screen. Alternatively, the image may be binarized using a fixed threshold. Adjusting the threshold allows for a "lightening" or "darkening" effect on the image.

This image enhancement method and apparatus may be advantageous in providing a better quality image than other image enhancement techniques, such as interpolation or duplication. In addition, this method and apparatus saves memory capacity since 200×200 dpi images can be produced without storing memory consuming 200×200 dpi images.

BRIEF DESCRIPTION OF THE DRAWINGS

The invention is described in detail with reference to the following drawings, wherein like numerals represent like elements and wherein.

DETAILED DESCRIPTION OF PREFERRED EMBODIMENTS

Figure 1:
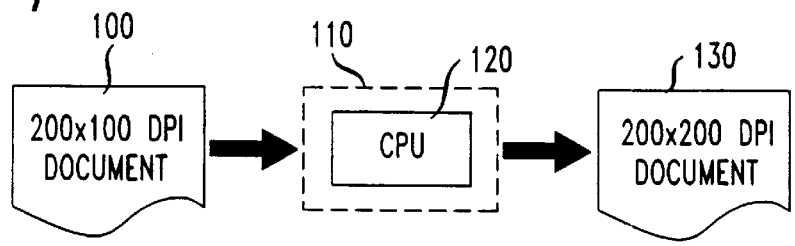
FIG. 1 is a block diagram of a processor for converting a lower resolution document to a higher resolution document.

FIG. 1 shows a representative block diagram of a document producing system that may be used in producing enhanced images of the present invention. The system 110 includes a CPU 120 for receiving a lower resolution document 100 (200×100 dpi in this example) and outputting a higher resolution document 130 (200×200 dpi in this example). The system 110 can be a facsimile machine, printer, computer display, or any other machine or device which produces or reproduces images.

Figure 2A:
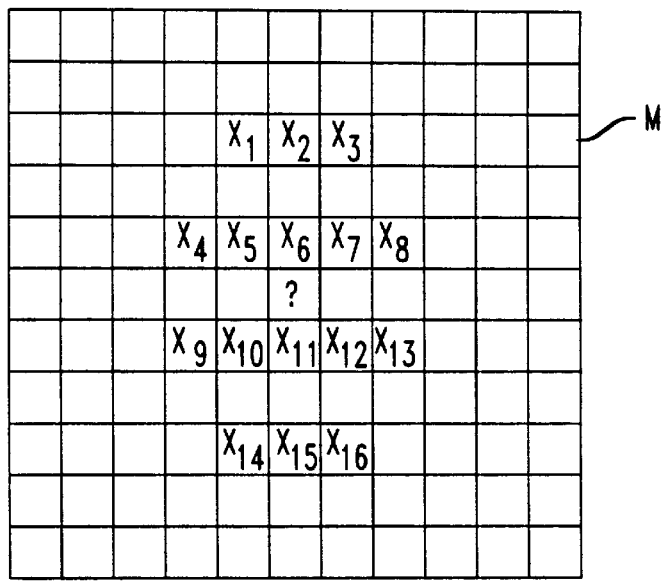
FIGS. 2A and 2B are examples of various pixel masks.
Figure 2B:
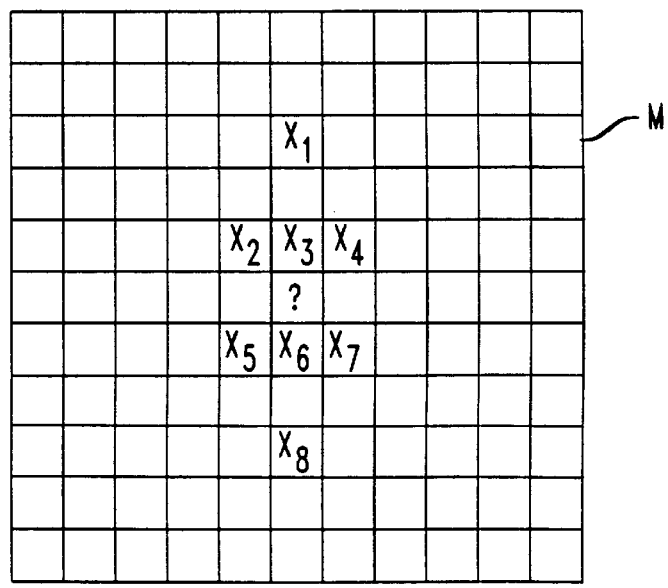

The CPU 120 is first trained through the submission of commonly used documents, known as training documents. The training method makes use of machine learning and statistical techniques, such as maximum likelihood estimation. The CPU 120 is first presented with training data which consists of facsimile images, for example, at 200×200 dpi of documents typically seen in practice. A mask is overlaid at each interior pixel in the image. FIGS. 2A and 2B are examples of such masks.

In FIG. 2A, the mask M is placed over each interior pixel and an index is formed for the pixel in question (?) based on the sixteen pixels marked x which are surrounding the pixel in question (?). If the pixel is "on" (i.e., black against a white background), a counter for that corresponding index is incremented. A second counter, t, keeps track of the number of occurrences of the index regardless of the pixel value.

For example, if pixels $x_1$–$x_3$ are "on" (black) and pixels $x_4$–$x_{16}$ are "off" (white), the CPU 120 would examine the value (i.e., "on" or "off") of the pixel in question (?) for that given index (i.e., index for $x_1$–$x_3$ "on", $x_4$–$x_{16}$ "off").

Once all the images in the training set have been processed, a probability table is computed by dividing the number of times a pixel was "on" by the total number of times that a particular set of pixel values occurred. For example, if a pixel was "on" 125 times out of a total number of 500 times the particular local pixel configuration occurred, the probability is 125/500=0.25.

Thus, the resulting probability table with 65,536 ($2^{16}$) probability estimates, in this example, is loaded into the system. Then, given a new facsimile image of similar type at the lower resolution of 200×100 dpi, the CPU 120 inserts a scan line of unknown image pixels and overlays a similar mask at each of the unknown pixels. The CPU 120 uses the sixteen nearby pixels, whose values are known, as an index, for using the probability table. The retrieved probability is an estimate that the pixel in question (?) is "on" or "off".

FIG. 2B shows a smaller mask that produces a much smaller probability table. In this case, 256 ($2^8$) entries are generated versus the 65,536 generated for the sixteen pixel mask shown in FIG. 2A. For this type of mask, the enhancement is based on a much smaller region around the pixel in question (?), and while requiring smaller storage for the probability table, the smaller probability table mass-produces a less accurate image.

Figure 3A:
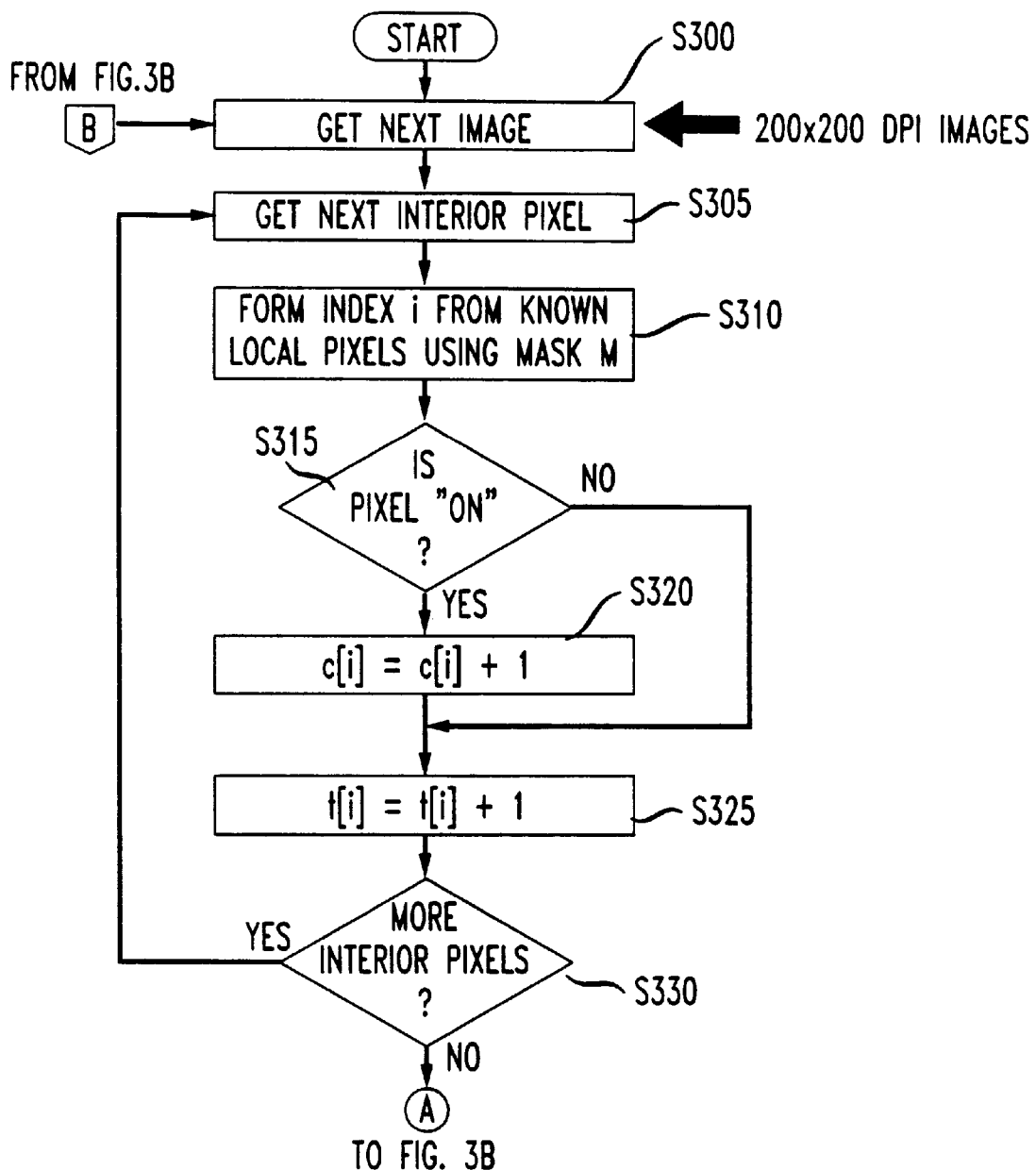
FIG. 3A–3B is a flowchart of the training phase according to the present invention.
Figure 3B:
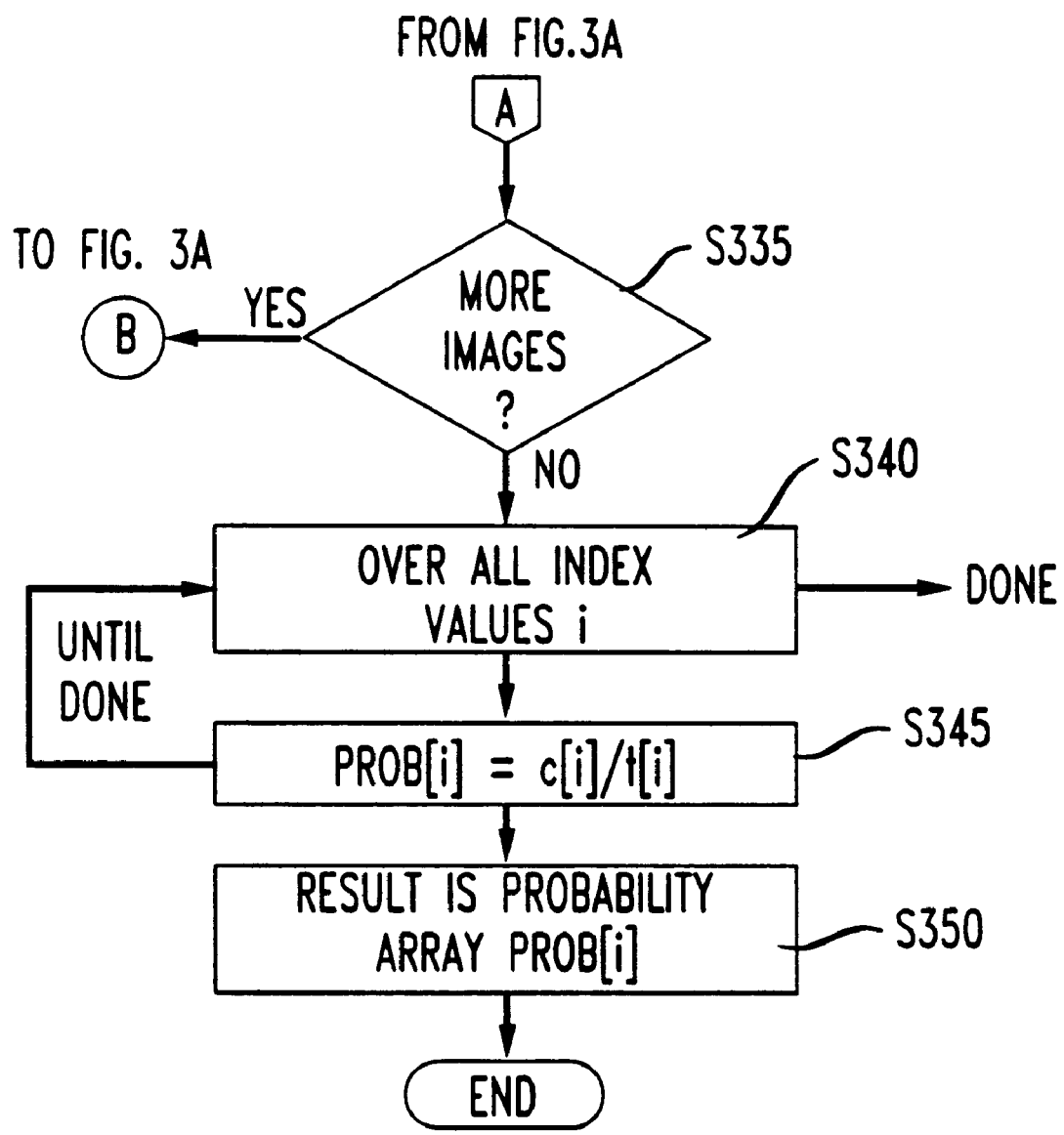

FIGS. 3A and 3B are flowcharts which describe the training phase of the invention in more detail. At step S300, higher resolution images are input, such as the 200×200 dpi image in this example. At step S305, each interior pixel is separately examined. At step S310, mask M, such as those shown in FIGS. 2A and 2B, is applied to the interior pixel selected at step S305. An index i is formed from the pixels surrounding the interior pixel based on the mask M.

At step S315, the system determines whether each pixel of the mask M is "on" or "off". If the pixel is on, the counter c is incremented to depict the number of pixels that are "on". Then, at step S325, another counter t is incremented to depict the number of times the index configuration was seen. If the pixel was determined to be "off" in step S315, the counter c is not incremented. However, the counter t is incremented at step S325. At step S330, a decision is made to determine whether any more interior pixels exist for examination. If more interior pixels exist, the steps S305, S310, S315, S320, S325 and S330 are repeated.

Once all of the interior pixels have been examined for an image (e.g., a document), the next image is retrieved at step S335 and steps S300, S305, S310, S315, S320, S325 and S330 are repeated for that next image. Once no more images exist, the overall index values are determined at step S340. At step S345, Prob[i] is computed for each index i by dividing the number of interior pixels that were "on" divided by the number of times the particular configuration occurred. The resulting probability table is then completed using all the indexes at step S350.

Figure 4A:
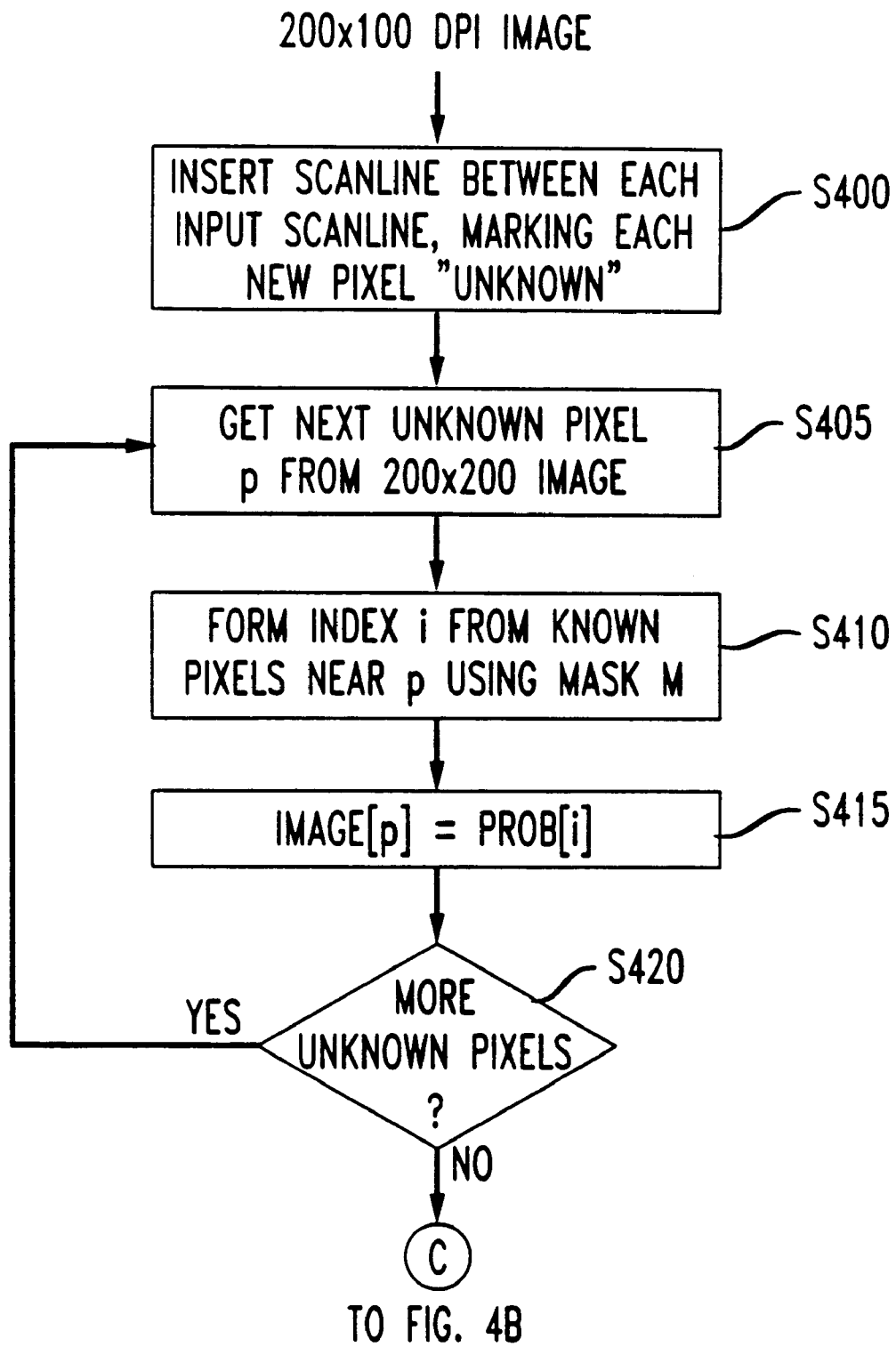
FIG. 4A–4B is a flowchart of the enhancement phase according to the present invention.
Figure 4B:
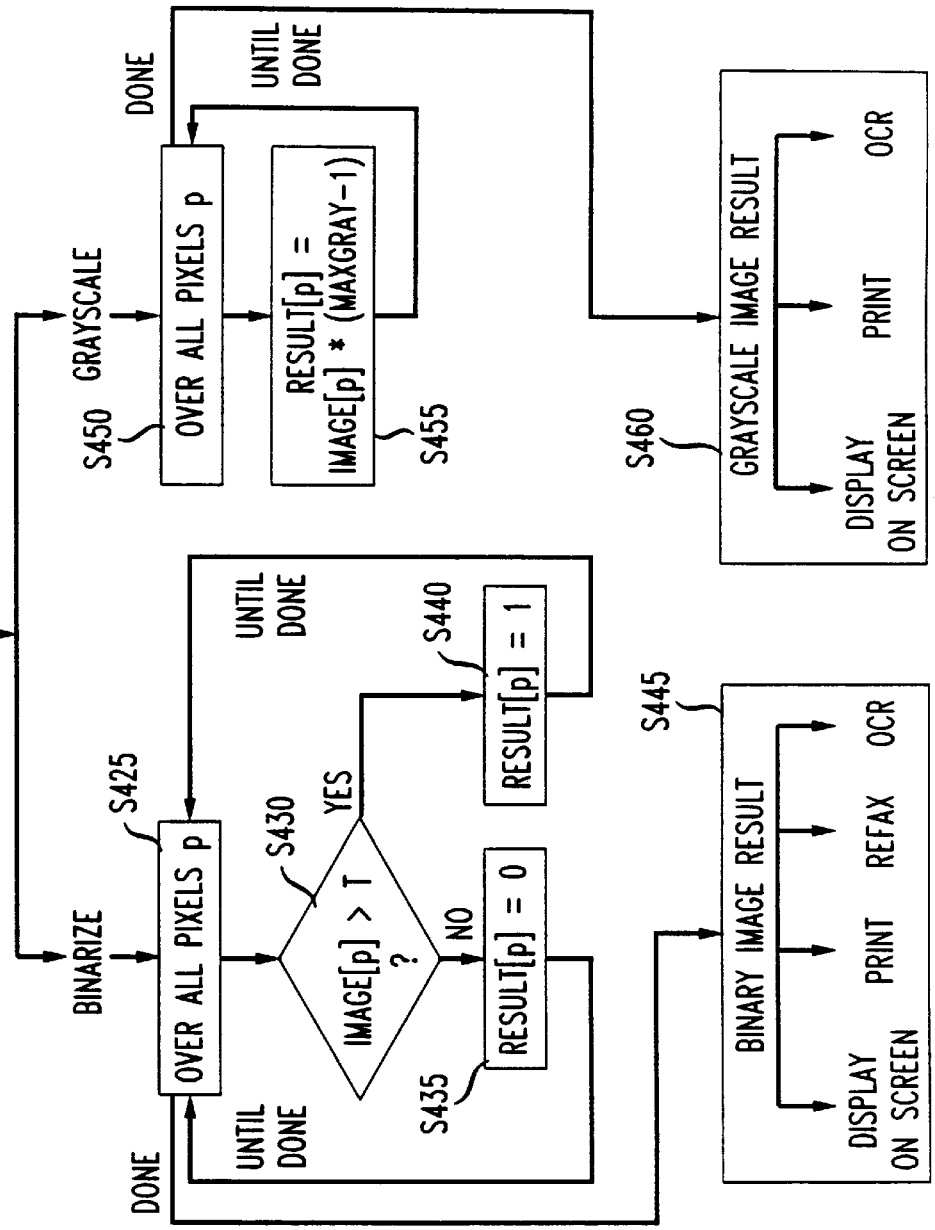

FIGS. 4A and 4B show a flowchart of the enhancement phase process. In this example, a lower resolution image (200×100 dpi) is input to the system. At step S400, a scan line is inserted between each input scan line to create a modified input image. Each new pixel from each new input scan line is marked as "unknown". At step S405, each unknown pixel p is examined, where p represents the pixel in question (?).

For each unknown pixel p, at step S410 an index i is formed from known pixels near p using mask M. The mask M is the same mask generated during the training phase. The mask M is centered over each of the unknown pixels p in the modified input image. The known pixels, marked with the x on the mask, are used to form the index and into the probability table Prob[i]. At step S415, the image array Image[p] is set to the probability Prob[i] which was learned during training. However, as described above, if the pixel configuration was not seen often enough during training, and no reliable probability was generated, a method such as straight interpolation may be used to determine the unknown pixel p. When the probability table is applied at step S415, the image array image[p] is set to 1.0 for those known pixels which are "on" in the original image, and to 0.0 for those known pixels which are "off".

Once the value of the pixel is determined, at step S420 the next pixel is retrieved and steps S400, S405, S410 and S415 are repeated. After all unknown pixels have been processed, the result is an image array containing a probability at each position indicating the likelihood the pixel should be "on" in an enhanced image. How this probabilistic image is utilized depends on the application. For example, it can be turned into a binary image, or it can be converted into a gray scale image.

As shown in FIG. 4B, if a binary image is desired, each pixel is retrieved at step S425. At step S430, each pixel is compared against a threshold T which is preferably set by a user or set beforehand. If the probability is above threshold T, at step S440, the final pixel is set to 1 (i.e., black against a white background). If the probability is below threshold T, the final pixel is set to 0 at step S435 (i.e., white against a white background).

At step S445, the final binary image may then be displayed onto a computer display, printed onto paper, refaxed at the enhanced resolution or passed to an OCR engine which takes a binary image as input, for example. Adjusting threshold T allows control similar to the "darkness" setting on a copy machine. The large value for the threshold T produces a "lightening" effect, while a smaller threshold T produces a darker image by turning on more pixels in the result.

Optionally, if a gray scale image is desired, at step S450, each pixel is retrieved individually. At step S455, each pixel is converted into a gray value by multiplying the maximum gray value minus one times the probability. For example, if a gray scale with 256 colors is in the desired result, each probability would be multiplied by 255. So a pixel with probability 1.0 would result in a gray value of 255. A probability of 0.0 would result in a gray value of 0 and a pixel probability 0.25 would result in a gray value of 63.75 which may be rounded to 64. At step S460, the final gray scale image could then be displayed on a computer screen, printed onto paper, or passed to an OCR engine which takes gray scale images as input, for example.

Figure 5:
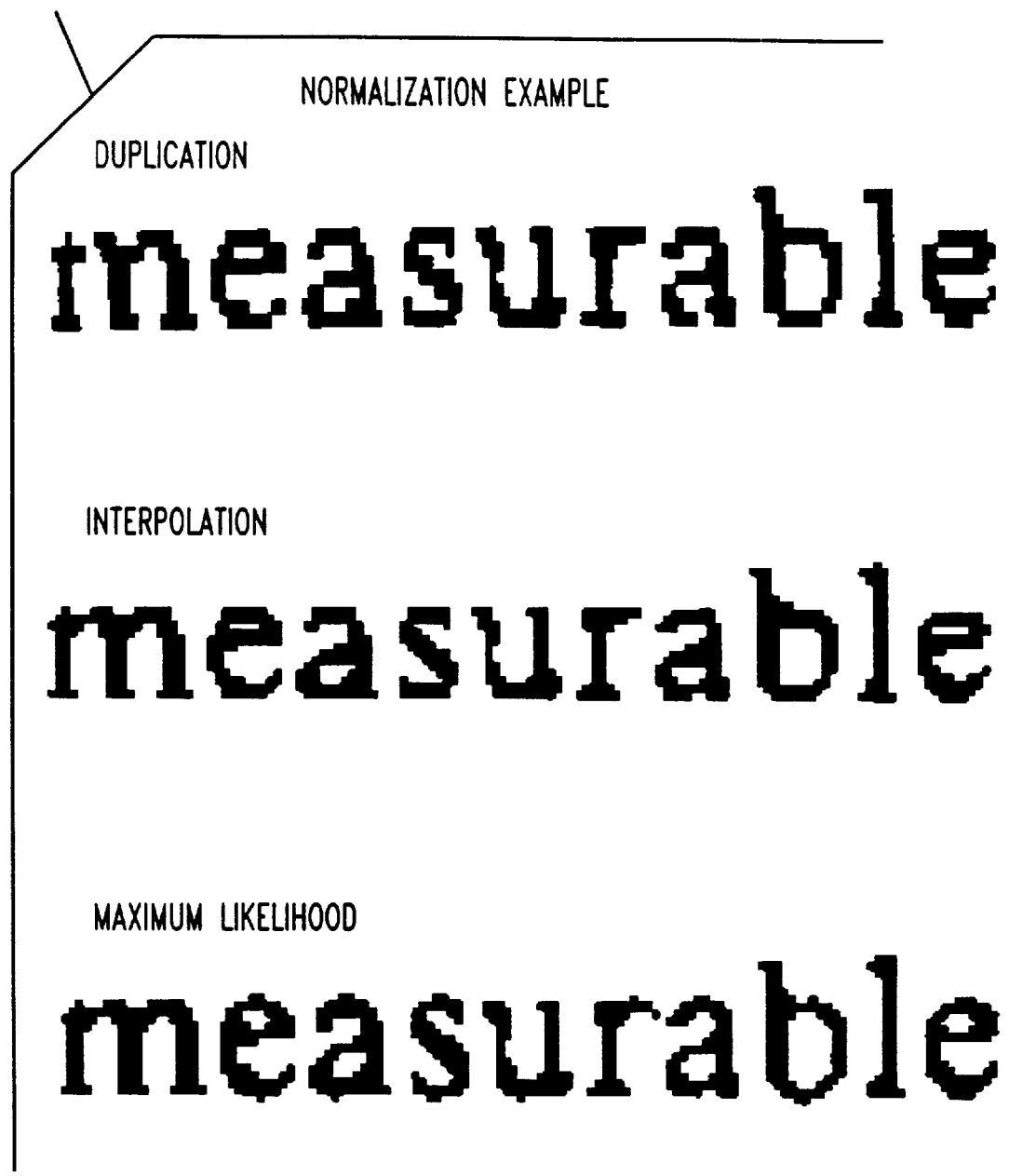
FIG. 5 is a comparison of maximum likelihood estimation with interpolation and duplication methods.

FIG. 5 is an example of how this enhancement method produces a 200×200 dpi image of high quality as compared with the duplication and interpolation methods. The resulting higher quality image can be used to increase the accuracy of an OCR engine. As an example of its effectiveness, the maximum likelihood method was tested by training on several hundred 200×200 dpi document images, e.g., typical business documents. A distinct set of 200×100 dpi similar documents was used as a test set. The test set was enhanced using the maximum likelihood method described herein and was visibly of higher quality than the same images enhanced using the duplication and interpolation methods. The interpolation enhancement technique produced an 18% improvement in OCR accuracy over the scan line duplication method. However, the maximum likelihood method gave images which had a 45% improvement in OCR accuracy over the duplication method.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for enhancing an image having a first resolution into an image having a second resolution higher than the first resolution, the method comprising the steps of:

training a processor to recognize pixel patterns surrounding selected pixels of a training image having only the second resolution, the training step including creating a probability table for the selected pixels based upon surrounding pixel patterns of the selected pixels;

receiving the image having the first resolution;

adding pixels of unknown value between existing pixels of the received image;

determining a pixel value for each of the pixels having the unknown value based on the probability table; and producing an image having the second resolution based on the determined pixel values.

2. The method of claim 1, further comprising the step of:

indexing the probability table according to each of the pixel patterns.

3. The method of claim 1, wherein half of the image produced includes pixels from the received image having the first resolution and an other half of the image produced includes pixels derived from statistical data derived in the training step.

4. The method of claim 1, wherein the first resolution is 200×100 dpi.

5. The method of claim 1, wherein the second resolution is 200×200 dpi.

6. The method of claim 1, wherein the produced image is a grayscale image.

7. The method of claim 1, wherein the produced image is a binary image.

8. The method of claim 1, wherein an intermediate representation of the product image is a probabilistic image.

9. The method of claim 1, wherein the training step creates the probability table using maximum likelihood estimation.

10. The method of claim 1, further comprising the step of setting a threshold value and wherein the producing step comprises comparing the threshold value with the determined pixel value.

11. The method of claim 1, wherein the training step further includes overlaying a mask over pixels of known value.

12. An apparatus for enhancing an image having a first resolution into an image having a second resolution higher than the first resolution, the apparatus comprising:

training means for recognizing pixel patterns surrounding selected pixels of a training image having only the second resolution, and for creating a probability table for the selected pixels based on pixel patterns surrounding the selected pixels of the training image;

receiving means for receiving the image having the first resolution;

image processing means for adding pixels of unknown value between existing pixels of the received image, and for determining a pixel value for each of the pixels having the unknown value based on the probability table; and image producing means for producing an image having the second resolution based on the determined pixel values.

13. The apparatus of claim 12, wherein the training means further indexes the probability table according to each of the pixel patterns.

14. The apparatus of claim 12, wherein the image producing means produces half of the image having the second resolution using pixels from the received image having the first resolution and an other half of the image having the second resolution using pixels derived from statistical data derived in the training step.

15. The apparatus of claim 12, wherein the first resolution is 200×100 dpi.

16. The apparatus of claim 12, wherein the second resolution is 200×200 dpi.

17. The apparatus of claim 12, wherein the produced image is a grayscale image.

18. The apparatus of claim 12, wherein the produced image is a binary image.

19. The apparatus of claim 12, wherein an intermediate representation of the produced image is a probabilistic image.

20. The apparatus of claim 12, wherein the training means creates the probability table using maximum likelihood estimation.

21. The apparatus of claim 12, further comprising setting means for setting a threshold valve and the image producing means compares the threshold valve with the determined pixel valves.

22. The apparatus of claim 12, wherein the training means trains the image processing means to recognize pixel patterns by overlaying a mask onto pixels of known value.

23. A method for enhancing an image having a first resolution into an image having a second resolution higher than the first resolution, the method comprising the steps of:

training a processor to recognize pixel patterns surrounding selected pixels of a training image having only the second resolution, the training step including creating a probability table for the selected pixels based upon surrounding pixel patterns of the selected pixels and indexing the probability table according to each of the pixel patterns;

receiving the image having the first resolution;

adding pixels of unknown value between existing pixels of the received image;

determining a pixel value for each of the pixels having the unknown value based on the probability table;

producing an image having the second resolution based on the determined pixel values; and wherein an intermediate representation of the product image is a probabilistic image.

* * * * *